US010838840B2

(12) United States Patent
M et al.

(10) Patent No.: US 10,838,840 B2
(45) Date of Patent: Nov. 17, 2020

(54) GENERATING DIFFERENT WORKLOAD TYPES FOR CLOUD SERVICE TESTING

(71) Applicant: HEWLETT PACKARD ENTERPRISE DEVELOPMENT LP, Houston, TX (US)

(72) Inventors: Siva Subramaniam M, Bangalore (IN); Thavamaniraja S, Bangalore (IN); Rajesh Teeparti, Bangalore (IN); Vinnarasu Ganesan, Bangalore (IN); SaiKrishna Reddy Vasipalli, Bangalore (IN); Brahmanand Vuppuluri, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 130 days.

(21) Appl. No.: 15/706,453

(22) Filed: Sep. 15, 2017

(65) Prior Publication Data
US 2019/0087301 A1 Mar. 21, 2019

(51) Int. Cl.
*G06F 11/34* (2006.01)
*H04L 12/26* (2006.01)
(Continued)

(52) U.S. Cl.
CPC .......... *G06F 11/3433* (2013.01); *G06F 9/455* (2013.01); *H04L 12/4633* (2013.01);
(Continued)

(58) Field of Classification Search
CPC .. G06F 11/3433; G06F 9/455; G06F 11/3688; G06F 11/3414; G06F 11/3006;
(Continued)

(56) References Cited

U.S. PATENT DOCUMENTS 6,182,246 B1 *   1/2001  Gregory ............... G06F 11/263
                                                     714/38.14
6,243,832 B1     6/2001  Eckes et al.
(Continued)

FOREIGN PATENT DOCUMENTS

CN    103399496 A    11/2013
CN    104333488 A     2/2015
(Continued)

OTHER PUBLICATIONS

Liu, Q. et al., "Hardware-in-the-Loop Simulation for Automated Benchmarking of Cloud Infrastructures", IBM T.J. watson Research Center, Proceedings of the 2012 Winter Simulation Conference, 2012, 12 pages.
(Continued)

*Primary Examiner* — David R Lazaro
(74) *Attorney, Agent, or Firm* — Hewlett Packard Enterprise Patent Department

(57) ABSTRACT

Example implementations relate to testing a cloud service. An example implementation includes creating cloud service resources. The resources may include a system node and a cloud application programming interface (API) for accessing the system node. Workloads of different types may be generated on the deployed cloud service according to workload parameters. In an example, the different workload types may include data workloads on the system nodes to consume computational resources of a computational resource pool assignable by the cloud service. In an example, the different workload types may include application programming interface calls to interface with cloud APIs of the cloud service.

20 Claims, 6 Drawing Sheets

(51) Int. Cl.
*H04L 12/46* (2006.01)
*G06F 9/455* (2018.01)
*H04L 29/06* (2006.01)
*H04L 12/24* (2006.01)
*H04L 29/08* (2006.01)

(52) U.S. Cl.
CPC ...... *H04L 41/5038* (2013.01); *H04L 43/0817* (2013.01); *H04L 43/50* (2013.01); *H04L 63/20* (2013.01); *H04L 67/38* (2013.01); *G06F 2009/45587* (2013.01); *G06F 2201/815* (2013.01); *H04L 67/10* (2013.01)

(58) Field of Classification Search
CPC ............. G06F 11/3684; G06F 11/3672; G06F 9/5072; H04L 41/5038; H04L 43/0817; H04L 43/50; H04L 41/145; H04L 41/5009
See application file for complete search history.

(56) References Cited

U.S. PATENT DOCUMENTS

| | | | |
|---|---|---|---|
| 9,069,599 | B2 | 6/2015 | Martinez et al. |
| 9,363,156 | B2* | 6/2016 | Chandrasekharapuram ................ G06F 11/263 |
| 9,396,160 | B1* | 7/2016 | Aithal ................ G06F 11/3668 |
| 9,436,725 | B1* | 9/2016 | Aithal ..................... G06F 16/24 |
| 9,444,717 | B1* | 9/2016 | Aithal ................ H04L 41/0896 |
| 9,876,703 | B1* | 1/2018 | Arllen .................. H04L 41/145 |
| 10,009,292 | B2* | 6/2018 | Dunbar ............... H04L 67/1008 |
| 2005/0166115 | A1* | 7/2005 | Daume ............... G06F 11/3414 714/741 |
| 2009/0300423 | A1* | 12/2009 | Ferris ..................... G06F 11/36 714/38.1 |
| 2010/0198960 | A1 | 8/2010 | Kirschnick et al. |
| 2013/0019015 | A1* | 1/2013 | Devarakonda ........ G06F 9/5072 709/226 |
| 2013/0054792 | A1 | 2/2013 | Sharaf |
| 2013/0067298 | A1 | 3/2013 | Li et al. |
| 2013/0080999 | A1 | 3/2013 | Yang |
| 2014/0026122 | A1* | 1/2014 | Markande ........... G06F 11/3664 717/124 |
| 2014/0067679 | A1 | 3/2014 | O'Reilly et al. |
| 2015/0100684 | A1 | 4/2015 | Maes et al. |
| 2015/0324182 | A1 | 11/2015 | Barros et al. |
| 2016/0062880 | A1* | 3/2016 | Moretto ............. G06F 11/3672 714/38.1 |
| 2016/0072730 | A1 | 3/2016 | Jubran et al. |
| 2016/0364307 | A1* | 12/2016 | Garg ........................ G06F 11/26 |
| 2017/0212822 | A1* | 7/2017 | Idrisov ................ G06F 11/3433 |
| 2017/0242774 | A1 | 8/2017 | Gopu et al. |
| 2017/0315902 | A1* | 11/2017 | Moretto .............. G06F 11/3672 |
| 2019/0087301 | A1* | 3/2019 | M ........................ G06F 11/3414 |

FOREIGN PATENT DOCUMENTS

| | | |
|---|---|---|
| EP | 2704401 A1 | 3/2014 |
| WO | WO-20131841373 | 12/2013 |
| WO | WO-2016048394 | 3/2016 |
| WO | WO-2016048394 A1 | 3/2016 |

OTHER PUBLICATIONS

Dotcom-Monitor, Inc., "Scalability Testing and Performance Tools," 2017, pp. 1-6 [online], Retrieved from the Internet on Jun. 16, 2017: <https://www.loadview-testing.com/scalability-testing/>.

Kai Hwang et al., "Cloud Performance Modeling with Benchmark Evaluation of Elastic Scaling Strategies," IEEE Transactions on Parallel and Distributed Systems, TPDS-2014-7-0595 R1, Jan. 30, 2015, pp. 1-14, IEEE.

International Searching Authority, "Notification of Transmittal of the International Search Report and the Written Opinion", PCT/US2014066392, dated May 27, 2015, 9 pages.

Open Source Testing, "Performance Testing", available online at < http://www.opensourcetesting.org/category/performance/ >, Dec. 26, 2017, 2 pages.

International Search Report and Written Opinion received for PCT Application No. PCT/US2014/066392, dated May 27, 2015, 9 pages.

Micro Focus, "Create a Script for a REST API," May 22, 2019, pp. 1-6, Retrieved from the Internet on Jun. 25, 2020 at URL:<admhelp.microfocus.com/lr/en/12.60-12.63/help/WebHelp/Content/VuGen/t_RESTAPI.htm>.

Naveenkumar Namachivayam, "Testing Rest APIs in HPE LoadRunner," Aug. 21, 2016, pp. 1-6, Retrieved from the Internet on Jun. 25, 2020 at URL:<dzone.com/articles/testing-rest-apis-in-hpe-loadrunner>.

Openstack Foundation, "Overview—rally 0.9.1.dev386 documentation," 2017, pp. 1-6, Retrieved from the Internet on Jun. 25, 2020 at URL:<docs.openstack.org/developer/rally/overview/overview.html>.

Raviteja Gorentla, "Load testing of a REST API, using HP LoadRunner's web_custom_request," Mar. 4, 2014, pp. 1-5, Retrieved from the Internet on Jun. 25, 2020 at URL:<easyloadrunner.blogspot.com/2014/03/load-testing-of-rest-api-using-hp.html>.

* cited by examiner

GENERATING DIFFERENT WORKLOAD TYPES FOR CLOUD SERVICE TESTING

BACKGROUND

Cloud-based computing architectures may provide a shared pool of configurable computing resources to deliver computing as a service to computing devices. The resources may be located remotely or locally, and may be shared over a network, e.g. the internet. Cloud services and resources may be scaled up or down to meet user demand.

BRIEF DESCRIPTION OF THE DRAWINGS

Certain examples are described in the following detailed description and in reference to the drawings, in which.

DETAILED DESCRIPTION

Figure 1:
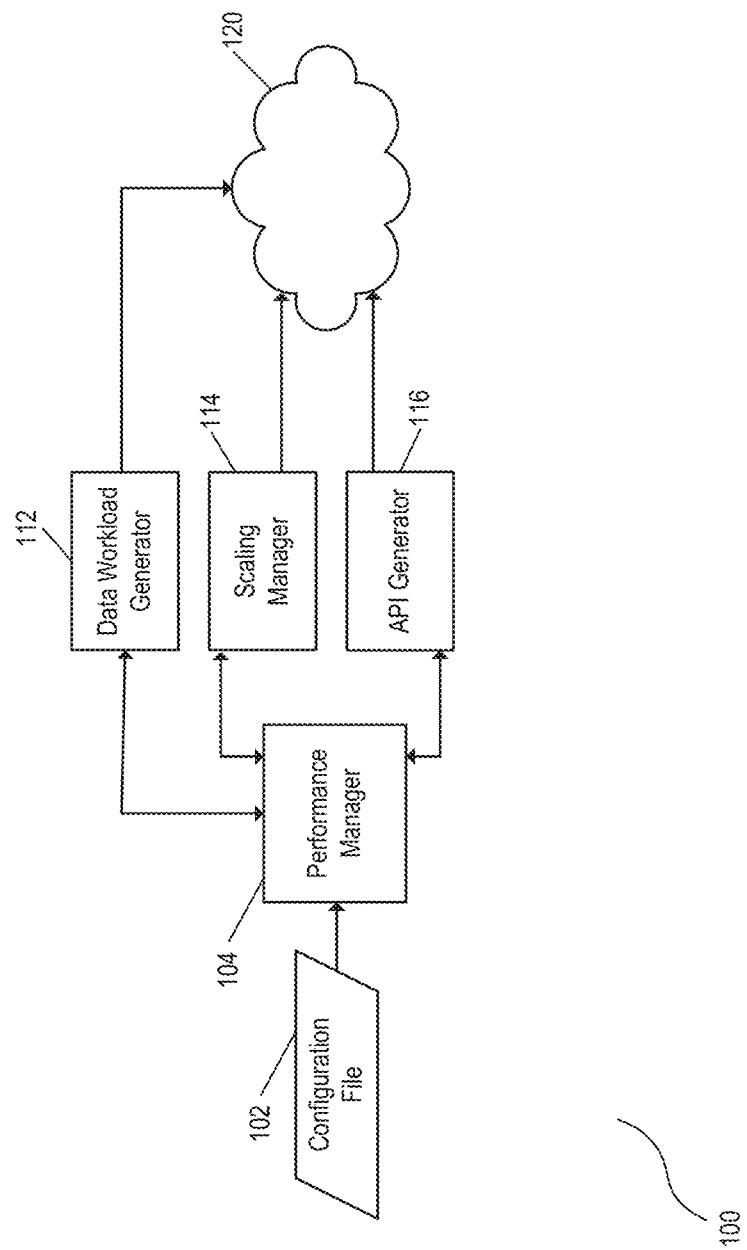
FIG. 1 is a block diagram of an example system for testing a cloud service.

Cloud computing may facilitate a delivery model for technology-enabled services that provides on-demand and pay-as-you-use access to an elastic pool of shared computing resources. Some examples of such resources may include applications, servers, storage, networks, etc. A cloud service provider may provision infrastructure resources responsive to receiving a request to deploy an application from a user, e.g. a virtual server, platform resources to enable deployment of the application, etc.

Cloud services may utilize various types of service elements (or computing resources). These computing resources may be hardware resources, software resources, or any combination thereof. For example, hardware resources may include computer systems, computer servers, workstations, or any other computer devices. Software resources may include operating system software, firmware, and/or application software. Computing resources may also include virtual machines, virtual servers, storage resources such as block storage volumes, load balancers, firewalls, etc. In an implementation, some or all of the computing resources provided by a cloud service may be utilized by a user of the cloud service. Where the cloud service includes a compute infrastructure solution for instance, the cloud service may include various computing resources such as CPU cores, memory, disks, etc.

A cloud service may be provided by a public cloud provider, by a private cloud provider, by a hybrid cloud provider, through a traditional data center offering, etc. For example, the cloud service may be rendered over a public network such as the Internet. Conversely, a cloud service may be rendered over a proprietary network that supplies services to a specific set of users. A hybrid cloud may combine private and public cloud offerings. Resources of a cloud service may be scaled up or down to meet anticipated workload demands. For example, resources may be scaled up to prevent resource bottlenecks experienced by high load demand on a given resource. Memory resources, for instance, may be scaled up where a service is experiencing a high memory load. Conversely, resources may be scaled down to reduce costs where a service has more than enough resources for meeting a workload demand, e.g. in a pay-as-you-use service model, and/or for reallocation to other workload demands.

Prior to live deployment, a cloud service may first be tested to verify the cloud service is scaled appropriately. However, testing methods may not accurately test how a cloud service will operate in a production environment because such testing methods may fail to holistically cover all variables that exist in a production environment, factor in different user personas, factor in different types of workloads operating at varying sequences of time, etc.

Accordingly, it may be useful to implement a cloud service testing system according to examples described below. For example, a testing system may generate workloads of different types, including data workloads to consume computational resources of a computational resource pool assignable by the cloud service, application programming interface calls to stress cloud APIs that enable access to the system nodes, etc.

By virtue of example cloud service testing described herein, a production like environment for scalability testing may be emulated. Workloads of different types may be generated on scaled resources according to template parameters that mimic a particular use case. For example, the generation of data workloads and application programming interface (API) calls may be started and stopped continually, at a given concurrency, and for a predetermined window of time, to emulate a production environment for a particular user persona.

By generating different workloads of different types according to workload parameters, and scaling cloud service resources according to scaling parameters, a cloud service may be tested for particular use cases. FIG. 1 is a block diagram of an example system 100, which may be useful for testing cloud services according to particular use cases of the cloud services.

FIG. 1 includes example performance manager 104. Performance manager 104 may include hardware, or any specialized combination of hardware and programming that may facilitate the communication of various testing parameters to cloud service testers. Performance manager 104 may include components, such as software components, processes, tasks, co-routines, functions, attributes, procedures, drivers, firmware, data, databases, data structures, application specific integrated circuits (ASIC), and other computing devices. Performance manager may reside on a non-volatile storage medium, e.g. NVRAM, Flash, SSD, etc., and may be configured to interact with a processor of a computing device.

Performance manager 104 may feed various testing parameters included in a configuration file 102 to various cloud service testers, such as data workload generator 112, scaling manager 114, and API generator 116 (also referred to collectively as the cloud service testers 112-116). The testing parameters may be various specifications and/or limitations for emulating a particular use case, such as the types of workloads to be generated and/or the resources to be scaled for cloud service testing, the times at which a cloud service tester may be stopped and/or started, the sizes of various workloads to be generated, the rate at which a workload may be increased or decreased, etc.

Any number and any combination of testing parameters may be fed to the various cloud service testers as may be specified in configuration file 102. While some testing parameters may be specific to a particular cloud service tester, others may be applicable to any number of cloud service testers. For example, the testing parameters may include scaling parameters to be fed to scaling manager 114 as specified by the scaling parameters. The testing parameters may also include workload parameters to be fed to workload generator 112 and/or API generator 116 to generate different types of workloads as specified by the workload parameters. The workloads may be generated on a cloud service 120, which may include, for example, a plurality of cloud resources such as system nodes.

In an example, the testing parameters specified in configuration file 102 may specify the starting and/or stopping of a particular cloud tester upon satisfaction of a condition. For example, data workload generator 112 may generate workloads, and/or scaling manager 114 may create particular resources, responsive to a threshold number of API calls generated by API generator 116. Performance manager 104 may start and/or stop any of the cloud service testers upon satisfaction of a condition as specified by configuration file 102, and/or for any time period or interval, as specified by the configuration file. As an illustrative example, a cloud service, e.g. cloud service 120, may offer a virtual desktop infrastructure (VDI) in which a desktop operating system is hosted remotely, e.g. in a centralized server and offered to a plurality of nodes. At the beginning of a workday, the cloud service may be stressed where multiple users attempt to boot their virtual desktops concurrently. This specific use case may be modeled by configuration file 102, in which cloud service testers may be started within a particular sequence and/or during a particular interval of time.

In an example, performance manager 104 may be controlled through an interface such that a user may manually start or stop data workload generator 112, scaling manager 114, and/or API generator 116. Thus, a user may modify and/or override the parameters specified by configuration file 102.

Any of cloud service testers 112-116, such as data workload generator 112, scaling manager 114, and API generator 116, may include hardware, or any specialized combination of hardware and programming that may facilitate the testing of a cloud service. Cloud service testers 112-116 may include components, such as software components, processes, tasks, co-routines, functions, attributes, procedures, drivers, firmware, data, databases, data structures, application specific integrated circuits (ASIC), and other computing devices. Cloud service testers 112-116 may reside on a non-volatile storage medium, e.g. NVRAM, Flash, SSD, etc., and may be configured to interact with a processor of a computing device.

Cloud service testers 112-116 may test differently scaled cloud services for different use cases according to received testing parameters. Scaling manager 114 for example, may scale cloud service 120 by creating and/or removing resources from cloud service 120, e.g. according to the scaling parameters communicated by performance manager 104. For example, scaling parameters may specify the CPU size, disk size, disk type, the size of memory to be allocated to a virtual machine, etc. The scaling parameters may specify concurrency limits, e.g. how many users can log in at a given time, how many nodes can be booted and/or loaded simultaneously, how many API calls can be exercised on a cloud API of the cloud service at a particular time, etc. As an additional example, the scaling parameters may specify scale limits, e.g. the number of virtual machines, the amount of block storage to be provisioned, etc.

Data workload generator 112 may stress cloud service 120. Specifically, data workload generator 112 may generate workloads on resources created by scaling manager 114 to stress the created resources. A created resource may be stressed where the created resource drops below a threshold level of efficiency, is utilized beyond a particular threshold, responds to a request beyond a threshold latency, etc.

Data workload generator 112 may simulate different use cases by generating workloads, e.g. as specified by workload parameters, that stress a particular resource. Data workload generator 112 may stress particular resources such as a computer processing unit (CPU) and/or system memory by generating workloads that result in a CPU load and/or memory load that exceeds a threshold. As an additional example, data workload generator 112 may generate workloads such that a system disk input/output (I/O) utilization exceeds a threshold, or such that a system experiences a threshold amount of network congestion. Data workload generator 112 may also generate workloads to simulate a use case by simulating a particular user persona, e.g. generating workloads pertinent to web development to simulate workloads generated by a web developer. As an additional example, data workload generator 112 may generate workloads for a period of time reflective of a particular use case.

API generator 116 may generate application programming interface (API) calls to be addressed by cloud service 120 to simulate a production environment. For example, API generator 116 may continually generate API calls for a duration of time (e.g., one hour), and may generate different API call loads at different times within that duration of time to simulate a production environment in which API calls are generated at varying rates. The API calls may be generated to interface with cloud APIs for accessing system nodes of cloud service 120.

In an example, the API calls may be generated by API generator 116 in coordination with data workload generator 112 and/or scaling manager 114 to simulate a use case. For example, data workload generator 112 may generate data workloads at a volume above a particular workload simultaneously with particular concurrency limits set by scaling manager 114 and simultaneously with API generator 116 generating a threshold number of API calls. As another example, a spike in API calls may be generated in conjunction with a drop in generated data workloads. Thus, different workload types may be generated at coordinated times and frequencies to simulate a particular use case.

In an example, iterative testing may occur. For instance, performance manager 104 may implement a first set of scaling parameters and/or workload parameters. Performance manager 104, upon receiving a communication that the first set of scaling parameters was executed, e.g. from scaling manager 114, and/or that the first set of workload parameters was executed, e.g. from data workload generator 112 and/or API generator 116, may execute a second set of scaling parameters and/or workload parameters. In an example, the second set of parameters may include increased workloads to be generated and/or smaller numbers of scaled resources to test a breaking point of the scaled cloud service. In another example, the first and second set of scaling parameters may simulate different use cases such that efficiently scaled systems may be determined for each particular use case.

Figure 2:
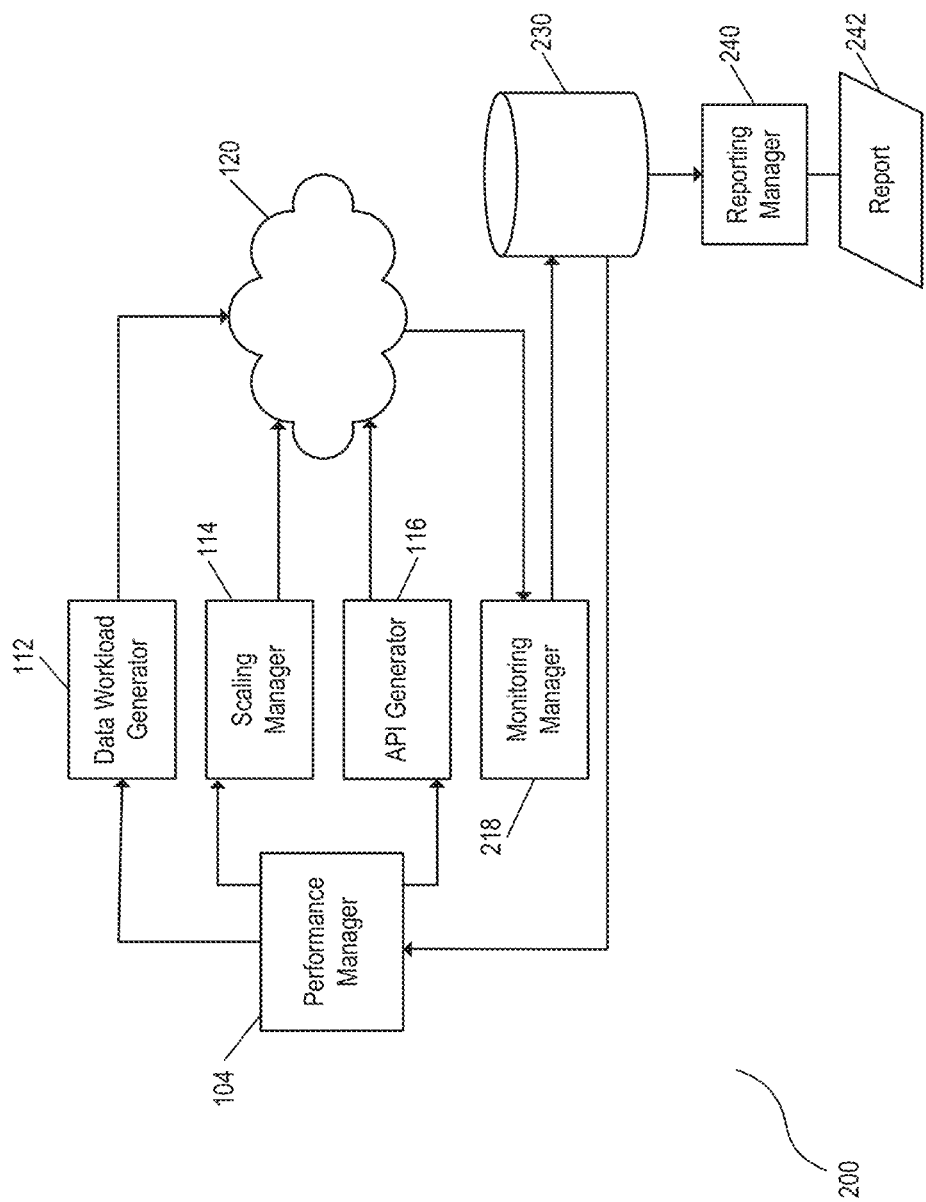
FIG. 2 is a block diagram of another example system for testing a cloud service.

FIG. 2 is another example system for testing a cloud service. System 200 may include similar architecture to that of system 100. For clarity and conciseness, some of the components of system 200 may be described with reference to system 100 of FIG. 1, including performance manager 104, data workload generator 112, scaling manager 114, API generator 116, and cloud service 120. As described above, performance manager 104 may feed various testing parameters to various cloud service testers, such as data workload generator 112, scaling manager 114, and API generator 116. Scaling manager 114 may scale a cloud service 120 according to scaling parameters. Data workload generator 112 and API generator 116 may test the cloud service 120 scaled by scaling manager 114 by generating different types of workloads on the cloud service 120.

As illustrated, scaling manager 114 may scale cloud service 120, and data workload generator 112 and API generator 116 may exert different types of workloads on cloud service 120 to test different use cases. Monitoring manager 218 may also be provided to monitor metrics of cloud service 120 during testing. Example metrics of cloud service 120 may include CPU and/or memory utilization of a cloud controller, cloud compute resources, a database server utilized by cloud service 120, etc. Metrics may include health statuses of cloud services and/or message queue lengths of cloud service requests. An example monitored metric for instance, may include the time for which a cloud service request is processed. Example metrics of cloud service 120 may also include database related metric, e.g. database growth rate, disk usage, cache hit ratios, etc.

The metrics monitored by monitoring manager 218 may be stored locally and/or remotely, e.g. in data store 230. In an example, performance manager 104 may access the metrics stored in data store 230 and may utilize the monitored metrics to determine whether a criterion is met, e.g. in the case of iterative testing as described above. Thus, performance manager 104 may implement a first set of testing parameters, and, subsequent to testing of those parameters, may implement a second set of testing parameters responsive to criteria indicated as satisfied by the monitored metrics.

Reporting manager 240 may access the metrics stored in data store 230 and may generate a report, e.g. report 242, including the monitored metrics. Reporting manager 240 may include APIs to fetch data from data store 230. In an example, reporting manager 240 may include web APIs to fetch data from data store 230 and may publish report 242, i.e., online. The report may be configured to be displayed on a graphical user interface or may be reported over email.

Reporting manager 240 may analyze the metrics stored in data store 230 and may generate insights from the analysis to be included in the generated report. For example, reporting manager 240 may identify bottlenecks in the cloud system services and may generate failure reports for each use case. In an example, reporting manager may generate a granular report that may be generated periodically, upon each iteration of testing, upon each particular use case tested, etc. Reporting manager may identify under what distribution of workloads, concurrency limits, etc., cloud service resources begin exhibiting threshold levels of inefficiencies and/or failure. As an example, reporting manager may determine how different types of workloads affect cloud service response times over different scale parameters. Thus, reporting manager 240 may identify efficient scaling parameters for particular use cases.

Figure 3:
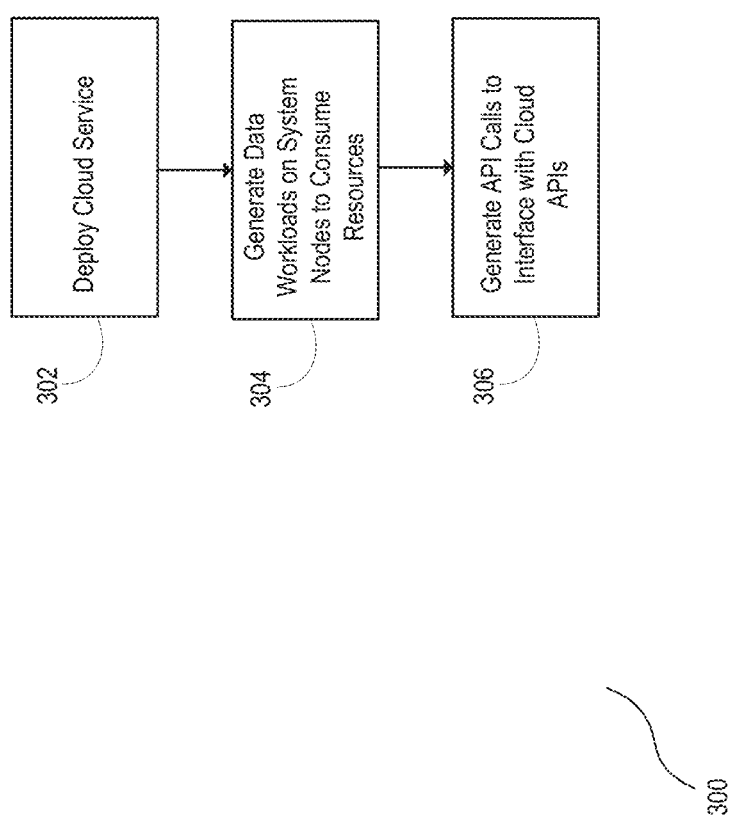
FIG. 3 is a flowchart depicting an example method for testing a cloud service.

FIG. 3 is a flowchart illustrating a method 300 for testing a cloud service. Although execution of method 300 is described below with reference to system 100, other suitable components for execution of method 300 may be utilized. Additionally, the components for executing method 300 may be spread among multiple devices. Method 300 may be implemented in the form of executable instructions stored on a machine-readable storage medium and/or in the form of electronic circuitry, e.g. hardware. In some examples, steps of method 300 may be executed substantially concurrently or in a different order than shown in FIG. 3. In some examples, method 300 may include more or less steps than are shown in FIG. 3. In some examples, some of the steps of method 300 may, at certain times, be ongoing and/or may repeat.

At block 302, a cloud service may be deployed. The deployed cloud system may have system resources and may include system nodes. In an example, the cloud system may be deployed by a scaling manager, e.g. scaling manager 114, and may be deployed according to a configuration file, e.g. configuration file 102 as described above. In an example, the deployed cloud system may be deployed according to scaling parameters, such as concurrency limits, and may dictate how many users can log in at a given time, how many nodes may be booted and/or loaded simultaneously, how many API calls can be exercised on cloud APIs of the cloud service at a particular time, etc.

Data workloads of different types may be generated on the deployed cloud system according to workload parameters. At block 304, generated data workloads may be deployed on created system nodes of the cloud service such that computational resources of the cloud service are consumed. The computational resources may be computational resources of a resource pool assignable by the cloud service, e.g. to answer a service request. At block 306, API calls may be generated to interface with cloud APIs of the cloud service, e.g., cloud APIs for accessing the created system nodes. API calls may be generated simultaneously and/or sequentially with data workloads for consuming computational resources of the system node. In an example, the different type of workloads may be generated according to workload parameters to simulate a particular use case as described above.

Figure 4:
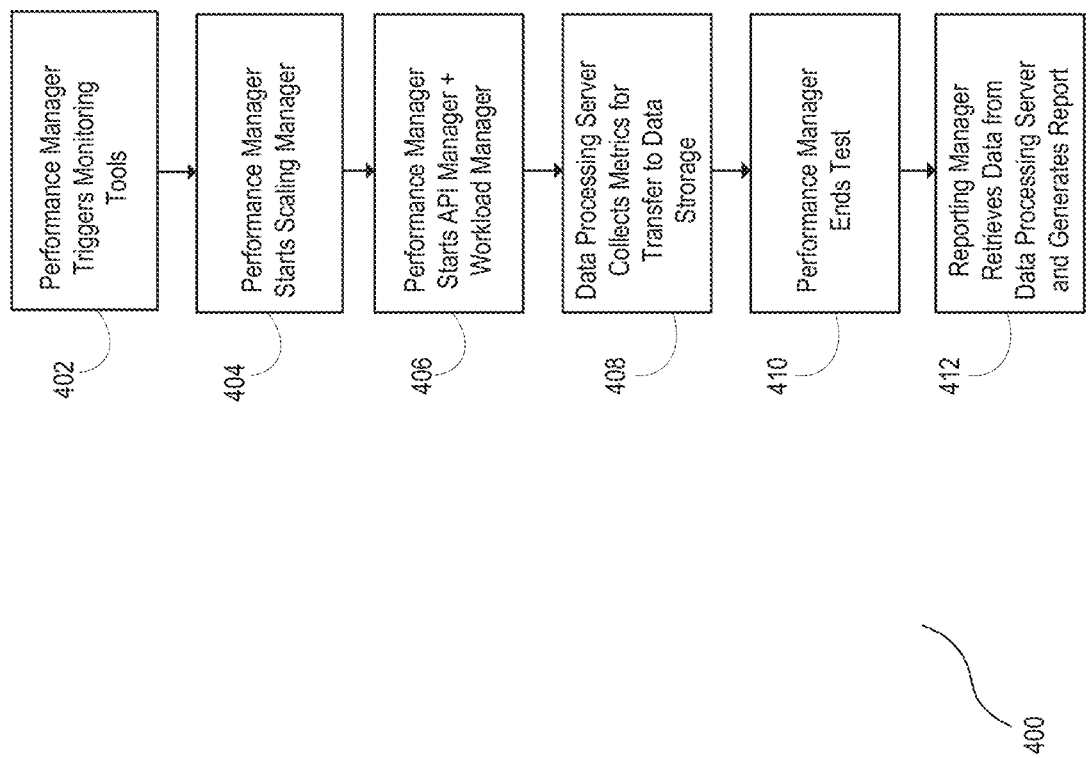
FIG. 4 is a flowchart depicting another example method for testing a cloud service.

FIG. 4 is a flowchart illustrating a method 400 for testing a cloud service. Although execution of method 400 is described below with reference to system 200, other suitable components for execution of method 400 may be utilized. Additionally, the components for executing method 400 may spread among multiple devices. Method 400 may be implemented in the form of executable instructions stored on a machine-readable storage medium and/or in the form of electronic circuitry, e.g. hardware. In some examples, steps of method 400 may be executed substantially concurrently or in a different order than shown in FIG. 4. In some examples, method 400 may include more or less steps than are shown in FIG. 4. In some examples, some of the steps of method 400 may, at certain times, be ongoing and/or may repeat.

At block 402, a performance manager may trigger monitoring tools, e.g., monitoring manager 218, to begin monitoring resources of a cloud service. The performance manager may trigger the monitoring tools such that metrics of the cloud service may be monitored when the cloud service is under test. At block 404, the performance manager may start and/or stop a manager for the creation of resources on the cloud service, e.g. scaling manager 114. In an example, the performance manager may start and/or stop managers to generate different types of workloads on the cloud service as well as managers for the creation of resources on the cloud service according to scaling and/or workload parameters. At block 406, performance manager may start managers for the generation of different types of workloads on the cloud service, e.g. data workload generator 112, API generator 116, etc.

At block 408, metrics of the cloud service may be collected for transfer to data storage. For instance, the monitoring tools triggered by the performance manager at block 402 may be collected and stored in data store 230 of FIG. 2. Once testing is complete, the performance manager, at block 410, may end the test by stopping the scaling of resources and generation of different workload types. At block 412, a scalability report may be generated, e.g. by reporting manager 240. Where iterative testing occurs, a scalability report may be generated after each test. In an example, the report may guide further iterative tests such that satisfied criteria included in the scalability report may determine further parameters for testing. Thus, stored metrics may be utilized for generating reports and/or for guiding iterative testing of the cloud service as described above.

Figure 5:
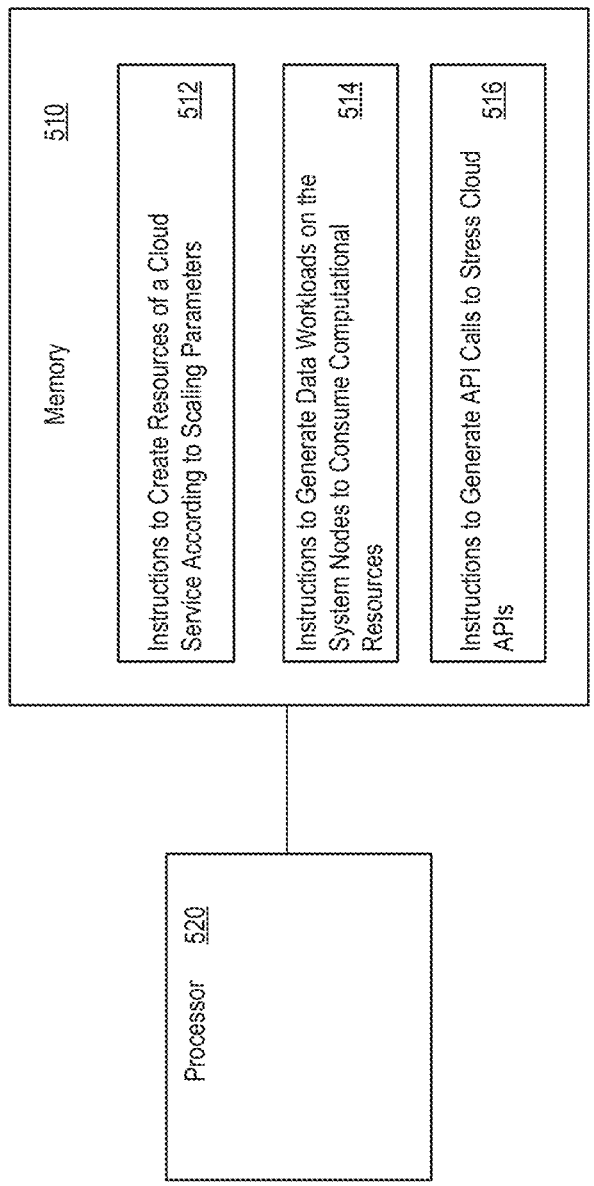
FIG. 5 is a block diagram of another example system for testing a cloud service.

FIG. 5 is a block diagram of an example system 500 for testing a cloud service. Example system 500 may include a physical processor 520 in communication with memory 510. The memory 510 may store machine readable instructions executable by physical processor 520 for testing the cloud service when executed. Instructions 512 may create cloud service resources according to scaling parameters. The scaling parameters may be specified in a configuration file, e.g. configuration file 102 of FIG. 1, or any other tangible medium for storing configuration parameters. In an example, the created cloud service resources may include system nodes.

Workloads of different types may be generated by instructions 514 or 516 on the created resources according to workload parameters. Like the scaling parameters, the workload parameters may be specified in a configuration file or any other file on a tangible medium for storing configuration parameters. Instructions 514 may be provided to generate data workloads on the system nodes to consume computational resources of a computational resource pool assignable by the cloud service. Instructions 516 may be provided to generate API calls to stress cloud APIs for accessing the system nodes. Accordingly, data workloads of different types may be generated for stressing the cloud service under test.

Figure 6:
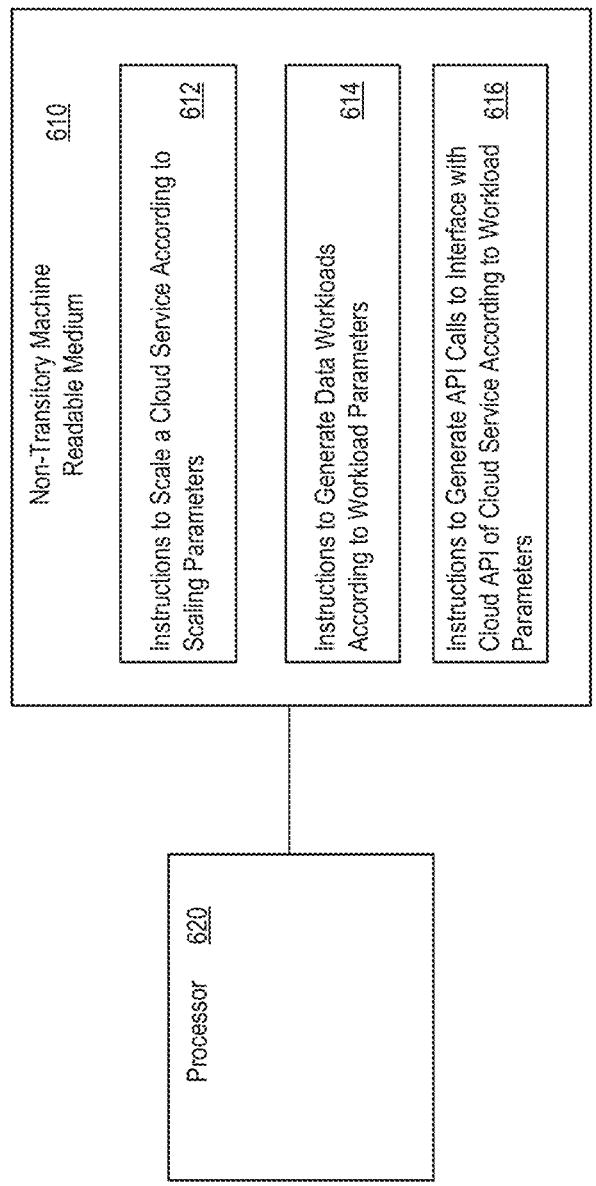
FIG. 6 is a block diagram of another example system for testing a cloud service.

FIG. 6 is a block diagram 600 of an example non-transitory machine readable medium 610 for testing a cloud service. Non-transitory machine readable medium 610 may be coupled to a processor, e.g. processor 620, and may include executable instructions thereon. Instructions 612, when executed, may cause the processor to scale a cloud service according to scaling parameters. In an example, the scaling may include the creation of system resources including a system node. In an example, the scaling parameters may include a start time for triggering a scale test for creating system resources and a stop time for ending the scale test.

The scaling parameters may be governed by a configuration file, e.g. configuration file 102, and may be created and or modified by a user, e.g. through a performance manager (such as performance manager 104 of FIG. 1). Thus, the scaling parameters may specify a period of time for the creation of system resources under test. Furthermore, the scaling parameters may include various scaling limits, e.g., a concurrency limit, a number of nodes to be created, an amount of resources to be dedicated to a created node, etc.

Instructions may be provided to generate workloads of different types according to workload parameters. Specifically, instructions 614 may be provided to, when executed, cause the processor to generate data workloads on created system nodes to consume computational resources of a computational resource pool. For instance, the cloud service may receive service requests, and may assign resources to satisfy the service requests from the computational resource pool.

In an example, the generated data workloads may simulate different use cases by generating workloads that stress a particular resource. Generated data workloads may stress particular resources such as a computer processing unit (CPU) and/or system memory by generating workloads that result in a CPU load and/or memory load that exceeds a threshold. Data workloads may be generated such that a system disk input/output (I/O) utilization exceeds a threshold, or such that a system experiences a threshold amount of network congestion. Data workloads may also be generated at a particular volume pattern or frequency to simulate a user persona, and may be generated for a period of time reflective of a particular use case.

Instructions 616 may be provided to, when executed, cause the processor to generate API calls to interface with cloud APIs of the cloud service. API calls may be generated at a particular volume and/or frequency to simulate a production environment. The API calls may be generated for a particular time as specified by the workload parameters. For example, API call loads may be generated at different times to simulate a production environment in which API calls are generated at varying rates. In an example, the API calls may be generated in coordination with the generation of data workloads and/or the creation of system resources to simulate a use case.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A system for comprising:
a physical processor; and
a memory storing machine readable instructions that, when executed by the physical processor, causes the processor to:
  deploy a cloud service having cloud service resources according to scaling parameters, wherein the cloud service resources include system nodes, and
  generate workloads of different types on the deployed cloud service resources according to workload parameters, the different types including:
    data workloads on the system nodes to consume computational resources of a computational resource pool assignable by the cloud service, and
    application programming interface (API) calls to stress cloud application programming interfaces (APIs), wherein the API calls are generated at coordinated times and frequencies with the data workloads to simulate a production environment, and wherein the cloud APIs enable access to the system nodes.

2. The system of claim 1, wherein the memory stores machine readable instructions that, when executed by the physical processor, causes the processor to monitor metrics of the system when the cloud service is under test.

3. The system of claim 2, further comprising a data processing server to collect the metrics for transfer to data storage.

4. The system of claim 3, wherein the memory stores machine readable instructions that, when executed by the physical processor, causes the processor to:
retrieve the data from the data processing server, and
generate a scalability report regarding the monitored metrics.

5. The system of claim 1, wherein the workload parameters include a frequency or volume at which API calls are generated.

6. The system of claim 1, wherein the workload parameters include a number of API calls to be generated upon satisfaction of a criterion.

7. The system of claim 1, wherein the workload parameters include a period of time during which API calls are generated.

8. The system of claim 1, wherein the scaling parameters include a start time for triggering a scale test for creating system resources and a stop time for ending the scale test.

9. The system of claim 1, wherein the scaling parameters and workload parameters are generated in coordination to simulate a use case.

10. A method for testing a cloud service comprising:
deploying, by a processor, a cloud service having system resources including a system node;
generating, by the processor, workloads of different types on the deployed cloud service according to workload parameters, the different types including:
data workloads on the system node to consume computational resources of a computational resource pool assignable by the cloud service, and
application programming interface (API) calls to stress cloud application programming interfaces (APIs), wherein the API calls are generated at coordinated times and frequencies with the data workloads to simulate a production environment, and wherein the cloud APIs enable access to the system node.

11. The method of claim 10, further comprising monitoring, by the processor, metrics of the cloud service when the cloud service is under test.

12. The method of claim 11, further comprising collecting, by a data processing server, the monitored metrics for transfer to data storage.

13. The method of claim 12, further comprising:
retrieving, by the processor, the data from the data processing server; and
generating, by the processor, a scalability report regarding the monitored metrics.

14. The method of claim 10, wherein the cloud service is deployed according to scaling parameters, the scaling parameters including a concurrency limit specifying, a maximum number of API calls that can be exercised on the cloud APIs of the cloud service at a particular time, or a maximum number of users that can access the cloud service at a particular time.

15. A non-transitory machine-readable storage medium comprising instructions executable by a processor for testing a cloud service, the machine-readable storage medium comprising:
instructions to cause the processor to scale the cloud service according to scaling parameters, the scaling to include creating system resources including a system node; and
instructions to cause the processor to generate workloads of different types on the created resources according to workload parameters, the different workload types including:
data workloads on the system node to consume computational resources of a computational resource pool assignable by the cloud service, and
application programming interface (API) calls to stress cloud application programming interfaces (APIs), wherein the API calls are generated at coordinated times and frequencies with the data workloads to simulate a production environment, and wherein the cloud APIs enable access to the system node.

16. The non-transitory machine-readable storage medium of claim 15, wherein the workload parameters include disk utilization, computer processing unit (CPU) utilization, memory utilization, or network congestion.

17. The non-transitory machine-readable storage medium of claim 15, wherein the workload parameters include a frequency or volume at which API calls are generated.

18. The non-transitory machine-readable medium of claim 15, wherein the scaling parameters include a start time for triggering a scale test for creating system resources and a stop time for ending the scale test.

19. The non-transitory machine-readable medium of claim 15, wherein the scaling parameters include a concurrency limit, a number of nodes to be created, or an amount of resources to be dedicated to a created node.

20. The non-transitory machine-readable medium of claim 15, wherein the scaling parameters and workload parameters are generated in coordination to simulate a use case.

* * * * *